United States Patent
Boatright et al.

(10) Patent No.: US 6,678,807 B2
(45) Date of Patent: Jan. 13, 2004

(54) SYSTEM AND METHOD FOR MULTIPLE STORE BUFFER FORWARDING IN A SYSTEM WITH A RESTRICTIVE MEMORY MODEL

(75) Inventors: Bryan D. Boatright, Austin, TX (US); Rajesh Patel, Austin, TX (US); Larry Edward Thatcher, Austin, TX (US)

(73) Assignee: Intel Corporation, Santa Clara, CA (US)

(*) Notice: Subject to any disclaimer, the term of this patent is extended or adjusted under 35 U.S.C. 154(b) by 285 days.

(21) Appl. No.: 09/740,803

(22) Filed: Dec. 21, 2000

(65) Prior Publication Data

US 2002/0120813 A1 Aug. 29, 2002

(51) Int. Cl.[7] .............................................. G06F 12/00
(52) U.S. Cl. ........................ 711/154; 711/112; 711/123; 711/171
(58) Field of Search ................................ 711/123, 125, 711/133, 154, 170, 171, 112

(56) References Cited

U.S. PATENT DOCUMENTS

| | | | |
|---|---|---|---|
| 5,606,670 A | * 2/1997 | Abramson et al. | 711/154 |
| 5,671,444 A | * 9/1997 | Akkary et al. | 710/52 |
| 5,854,914 A | * 12/1998 | Bodas et al. | 712/216 |
| 5,878,245 A | * 3/1999 | Johnson et al. | 711/154 |
| 6,141,747 A | * 10/2000 | Witt | 712/225 |
| 6,266,744 B1 | * 7/2001 | Hughes et al. | 711/146 |
| 6,298,423 B1 | * 10/2001 | Johnson et al. | 711/154 |
| 6,334,171 B1 | * 12/2001 | Hill et al. | 711/138 |
| 6,338,128 B1 | * 1/2002 | Chang et al. | 711/203 |
| 6,473,832 B1 | * 10/2002 | Ramagopal et al. | 711/118 |

OTHER PUBLICATIONS

Johnson, "Superscalar Microprocessor Design", ©1991 Prentice–Hall, Inc., p. 50–53.*
Tanenbaum, "Structured Computer Organization", © 1984 Prentice–Hall, Inc., p. 10–12.*

* cited by examiner

*Primary Examiner*—Donald Sparks
*Assistant Examiner*—Brian R. Peugh
(74) *Attorney, Agent, or Firm*—Kenyon & Kenyon

(57) ABSTRACT

The present invention relates to the use of multiple store buffer forwarding in a microprocessor system with a restrictive memory model. In accordance with an embodiment of the present invention, the system and method allow load operations that are completely covered by two or more store operations to receive data via store buffer forwarding in such a manner as to retain the side effects of the restrictive memory model thereby increasing processor performance without violating the restrictive memory model. In accordance with an embodiment the present invention, a method for multiple store buffer forwarding in a system with a restrictive memory model includes executing multiple store instructions, executing a load instruction, determining that a memory region addressed by the load instruction matches a cacheline address in a memory, determining that data stored by the multiple store instructions completely covers the memory region addressed by the load instruction, and transmitting a store forward is OK signal.

20 Claims, 3 Drawing Sheets

SYSTEM AND METHOD FOR MULTIPLE STORE BUFFER FORWARDING IN A SYSTEM WITH A RESTRICTIVE MEMORY MODEL

FIELD OF INVENTION

The present invention relates to store buffer forwarding in microprocessors, and more particularly, to multiple store buffer forwarding in a microprocessor system with a restrictive memory model.

BACKGROUND

Many modern microprocessors implement store buffer forwarding which is a mechanism that improves microprocessor performance by completing a younger dependent load operation by using data from an older, completely overlapping store operation. This forwarding can occur while the store operation is speculative or has passed the point of speculation and is part of the committed machine state. In either case, the load operation's execution is delayed minimally when it can read its data directly from the buffer without waiting for that data to become globally observed (GO). For multiple store operations, prior processors, such as the Intel® Pentium® III, and the related instruction set architectures (ISAs) that run on these processors have stalled the execution of the load operation until the older multiple store operations become globally observed. The Intel® Pentium® III is manufactured by Intel Corporation of Santa Clara, Calif.

Because store buffer forwarding has implications on the order in which all processes in a multi-threaded or multi-processor system observe store operations from the other processes, a processor architecture must carefully specify the rules under which store buffer forwarding may occur. For example, the Intel® Architecture 32-bit ISA (IA-32) product family has essentially implemented the Scalable Processor Architecture (SPARC®) total store order (TSO) memory model from SPARC International Inc.™ of Santa Clara, Calif.

The TSO memory model has two restrictions related to store buffer forwarding:

1. A younger load operation may only receive forwarded data from a single older store buffer entry; and
2. The older store buffer entry must completely cover the region of memory being read by the younger load operation.

Many existing IA-32 code sequences produce situations in which these two TSO restrictions considerably degrade the performance of the processor. When a typical IA-32 processor executes a load operation that encounters one of the conditions listed above, the processor stalls the load operation's execution until the offending condition clears. While waiting for the contents of the store buffer entry to become GO, the load operation and all instructions that are dependent on the load operation are stalled, thus reducing processor performance.

DETAILED DESCRIPTION

Figure 1:
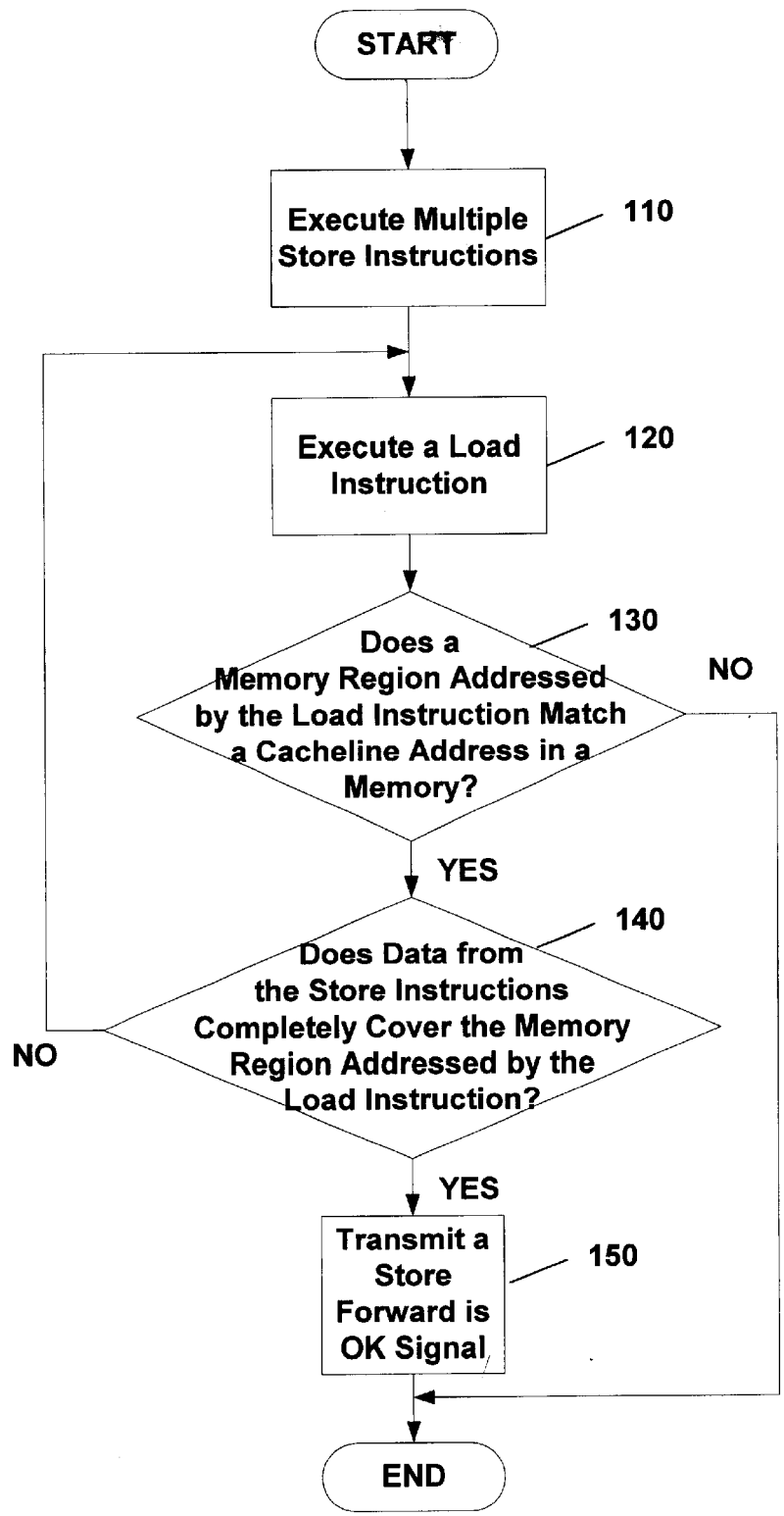
FIG. 1 is a flow diagram of a method for providing multiple store buffer forwarding, in accordance with an embodiment of the present invention.

In accordance with an embodiment of the present invention, the system and method provide a novel mechanism to allow load operations that are completely covered by two or more store operations to receive data via store buffer forwarding in such a manner as to retain the side effects of the two TSO restrictions thereby increasing processor performance without violating the restrictive memory model. For greater clarity, the problem can be described using some sample program executions.

Archetypical Store Buffer Forwarding Example

The following sample code segment demonstrates the type of store buffer forwarding that the TSO memory model specifically allows:

```
MOV EBX, 0x1000      ; set up the base address
MOV [EBX],           ; store 4 bytes (0x00001234) to location 0x1000
0x00001234
...                  ; zero or more other instructions
MOV EAX, [EBX]       ; load 4 bytes from location 0x1000
```

In this example, store buffer forwarding hardware is permitted to bypass the store data value (0x00001234) directly to the younger load operation even before other processors observe the store data value. Note that the above single store operation's data completely overlaps, that is, covers, the memory region that the load operation references. In other words, in this example, the same four bytes in the memory that are used by the store operation to store the data value are used by the load operation.

Disallowed Store Buffer Forwarding Example

This sample code segment demonstrates a type of store buffer forwarding that is not allowed in the IA-32 restrictive memory model (TSO):

```
MOV EBX, 0x1000       ; set up the base address
MOV [EBX], 0x0000     ; store 2 bytes (0x0000) to location 0x1000
MOV [EBX] +2, 0x1234  ; store 2 bytes (0x1234) to location 0x1002
...                   ; zero or more other instructions
MOV EAX, [EBX]        ; load 4 bytes, from location 0x1000
```

In this example, it would be desirable to forward store data from the two store operations to the single load operation, since each store operation provides half of the data required by the load operation. Unfortunately, this multiple store buffer forwarding is specifically disallowed in the TSO memory model, and, therefore, the load operation must wait to complete until the two store operations become globally observed (GO). Multiple store buffer forwarding is disallowed by the TSO memory model to ensure a reliable and consistent order in which store operations can become globally observed by other processors in the system.

The problem that store forwarding from multiple store buffer entries can cause is illustrated with the following code sequences, which are executed on two separate processors in a multi-processor system:

| Processor 0: | |
|---|---|
| P0_1) MOV EBX, 0x1000 | ; set up the base address |
| P0_2) MOV [EBX], 0x0102 | ; store 2 bytes (0x0102) to 0x1000 |
| P0_3) MOV [EBX] +2, 0x0304 | ; store 2 bytes (0x0304) to 0x1002 |
| P0_4) MOV EAX, [EBX] | ; load 4 bytes from location 0x10000 |
| P0_5) MOV EAX, [EBX] | ; load 4 bytes from location 0x10000 |

| Processor 1: | |
|---|---|
| P1_1) MOV EBX, 0x1000 | ; set up the base address |
| P1_2) MOV [EBX], 0xFFFFFFFF | ; store 4 bytes (0xFFFFFFFF) to 0x1000 |

Sample Execution 1

In this example, processor 0 has two load operations, P0_4 and P0_5, which, according to TSO, must wait for the two older store buffer entries, P0_2 and P0_3, to become GO before the load operations can execute. In a system that implements TSO with this restriction, the following total order, that is, the order in which operations from both processors occur in time, would be possible:

| Event | Store Buffer Contents (if a store) | Result (if a load) | Memory Contents |
|---|---|---|---|
| Initial conditions at memory location 0x1000 | | | 00 00 00 00 |
| P0_2 | 01 02 xx xx | | 00 00 00 00 |
| P0_2 becomes GO | | | 01 02 00 00 |
| P0_3 | xx xx 03 04 | | 01 02 00 00 |
| P0_3 becomes GO | | | 01 02 03 04 |
| P0_4 | | 01 02 03 04 (from memory) | 01 02 03 04 |
| P1_2 | FF FF FF FF | | 01 02 03 04 |
| P1_2 becomes GO | | | FF FF FF FF |
| P0_5 | | FF FF FF FF (from memory) | FF FF FF FF |

The results of this sample execution are consistent with the TSO memory model in that neither loads P0_4 or P0_5 receive data directly from processor 0's store buffer.

Sample Execution 2

The following sample execution represents another possible total order in a system that allows store buffer forwarding from multiple store buffer entries, but does not implement the present invention.

| Event | Store Buffer Contents (if a store) | Result (if a load) | Memory Contents |
|---|---|---|---|
| Initial conditions at memory location 0x1000 | | | 00 00 00 00 |
| P0_2 | 01 02 xx xx | | 00 00 00 00 |
| P0_3 | xx xx 03 04 | | 00 00 00 00 |
| P0_4 | | 01 02 03 04 (from store buffer) | 00 00 00 00 |
| P0_2 becomes GO | | | 01 02 00 00 |
| P1_2 | FF FF FF FF | | 01 02 00 00 |
| P1_2 becomes GO | | | FF FF FF FF |
| P1_3 becomes GO | | | FF FF 03 04 |
| P0_5 | | FF FF 03 04 (from memory) | FF FF 03 04 |

Note that the result of load operation P0_5 is not consistent with the result of load P0_4. If load P0_4 saw the value 0x01020304, then load P0_5 should have seen either that value or 0xFFFFFFFF. The result that load P0_5 actually saw, 0xFFFF0304 makes it appear as if store P0_3 occurred twice.

Sample Execution 3

Had stores P0_2 and P0_3 become globally observed at the same point in time (that is, atomically), the situation demonstrated in Sample Execution 2 would not have occurred. In accordance with an embodiment of the present invention, the following sample execution represents a possible total order in a system that implements the present invention.

| Event | Store Buffer Contents (if a store) | Result (if a load) | Memory Contents |
|---|---|---|---|
| Initial conditions at memory location 0x1000 | | | 00 00 00 00 |
| P0_2 | 01 02 xx xx | | 00 00 00 00 (store is not GO) |
| P0_3 | xx xx 03 04 | | 00 00 00 00 (store is not GO) |
| P0_4 | | 01 02 03 04 (from store buffer) | 00 00 00 00 |
| P1_2 | FF FF FF FF | | 00 00 00 00 |
| P0_2, P0_3 become GO atomically | | | 01 02 03 04 |
| P1_2 becomes GO | | | FF FF FF FF |
| P0_5 | | FF FF FF FF (from memory) | FF FF FF FF |

As shown above, load operation P0_5 now sees a result consistent with the TSO memory model. Embodiments of the present invention, therefore, provide a mechanism to forward data from multiple store buffer entries in such a way that the invention guarantees that those store buffer entries update system memory (that is, become globally observed) at a single point in time.

In accordance with an embodiment of the present invention, the system and method can make use of a write combining buffer (WCB). A WCB is a structure that usually contains buffering for several cachelines of data and control logic that allows individual store operations to "combine" into a larger unit of data, which is generally equal in size to the size of the cachelines. When this unit of data is written back to system memory or to a processor cache, it is done so atomically and with a single transaction. This improves processor performance by conserving bus transaction and cache bandwidth, because, without a WCB, each individual store operation would have to access the system bus or cache port separately. This would use system resources less efficiently than if a number of store operations could be pre-grouped into a single transaction.

FIG. 1 is a flow diagram of a method for providing multiple store buffer forwarding, in accordance with an embodiment of the present invention. In FIG. 1, multiple store instructions can be executed 110, generally, to combine data values from the multiple store instructions into a single value. In accordance with an embodiment of the present invention, this single value can be combined into an entry in a processor memory, such as an entry in a WCB, which can remain invisible to all other processors in the system until all of the multiple store instructions have completed executing. A load instruction can be executed 120 to load data from a memory coupled to the system. A check can be performed to determine whether a memory region addressed by the load instruction matches any cacheline addresses stored in the WCB 130. If a match is found, then, a check can be performed to determine whether all of the memory region addressed by the load instruction, is covered by data that has been stored by the multiple store instructions 140. If all of the memory region is covered by the data from the multiple store instructions, then, a store forward is "OK" signal can be generated 150. At this point the load instruction can complete executing by reading the data from the WCB entry.

If a match is not found, then, the method is not needed and the method can end. If all of the memory region is not covered by data from the multiple store instructions, then, the method can return to execute 120 the load instruction again. In general, the previous load instruction execution 120 and all subsequent dependent instructions are flushed from the system before the load instruction can be executed again.

In accordance with an embodiment of the present invention, new hardware can be added to the WCB to implement the functionality required to allow store forwarding from multiple store operations without violating the spirit and intent of the IA-32 TSO memory model. In general, the two requirements that are necessary to achieve this functionality include:

1. The store operation(s) must completely cover the memory region addressed by the younger load operation; and
2. The store operation(s) that forward data to the load operation must become globally observed at the same time (that is, atomically).

Figure 2:
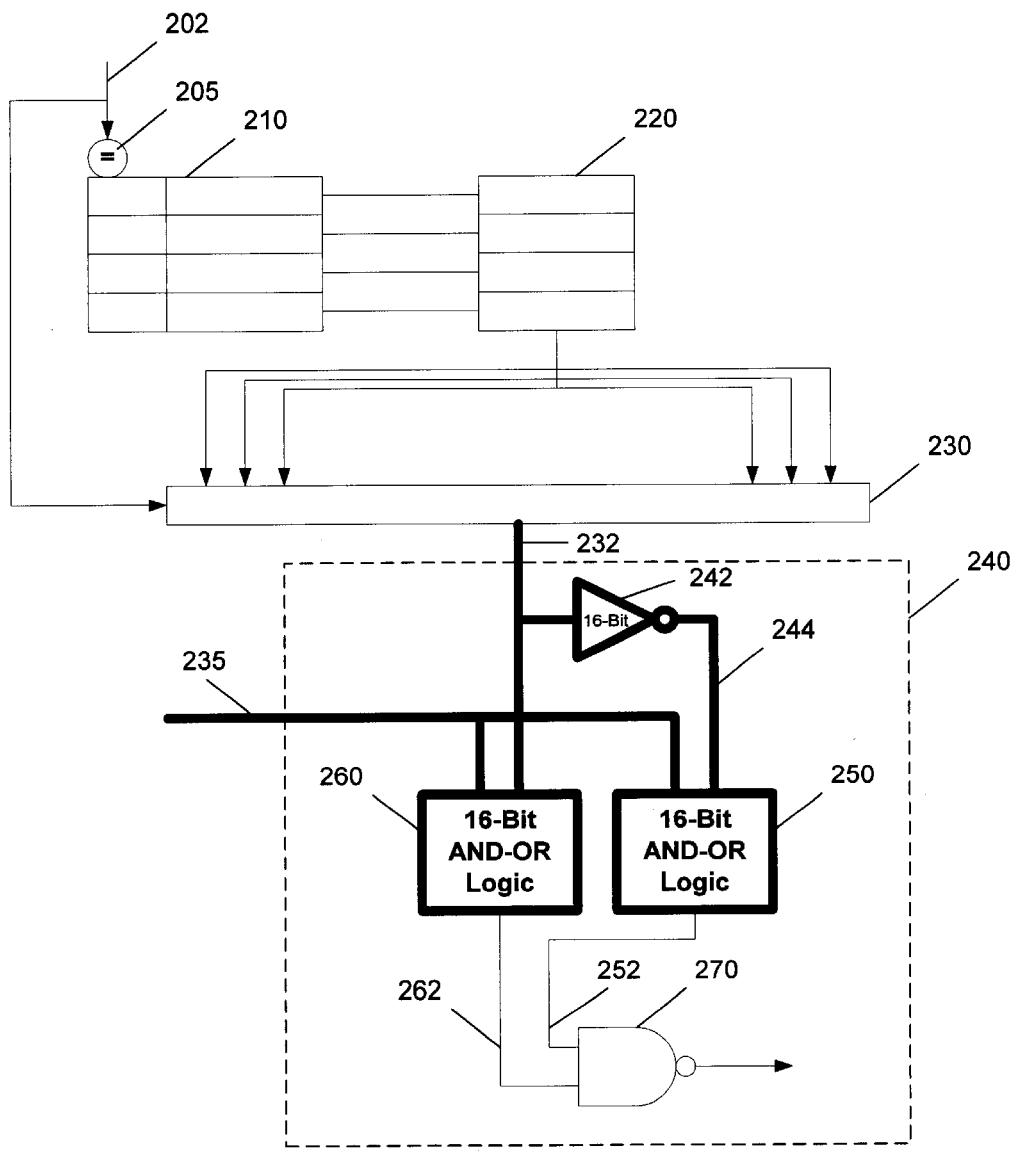
FIG. 2 is a schematic block diagram of a write combining buffer configuration in which multiple store buffer forwarding can be implemented, in accordance with an embodiment of the present invention.

In accordance with an embodiment of the present invention, the system can achieve the first requirement by adding hardware to the WCB buffer that compares, on a byte-by-byte basis, the region of memory addressed by the load operation to the available store data in the WCB. If it is acceptable to forward the data, the data is read to satisfy the load operation. In accordance with other embodiments of the present invention, the data can be read from any memory containing the data, for example, the WCB, a store buffer, an other buffer, a register, a memory and a cache memory. FIG. 2 is a schematic block diagram of a write combining buffer configuration in which multiple store buffer forwarding can be implemented, in accordance with an embodiment of the present invention.

In FIG. 2, a cacheline address comparison component 205 can be coupled to a WCB Address and Data Buffer 210. The cacheline address comparison component 205 can be configured to receive an incoming load operation 202 and compare a cacheline address in the incoming load operation 202 with the cacheline addresses of existing entries in the WCB Address and Data Buffer 210. The WCB Address and Data Buffer 210 can be coupled to a WCB data valid bit vector buffer 220, which indicates the data bytes in the WCB Address and Data Buffer 210 that have been written by the store operations. In an embodiment of the present invention, the data entries in both the WCB Address and Data Buffer 210 and the WCB data valid bit vector buffer 220 are generally of equal size, for example, 64 data bytes per entry. The WCB data valid bit vectors buffer 220 can be connected to a Multiplexer 230, which can be configured to receive a data valid bit vector from the WCB data valid bit vector buffer 220 and configured to receive load operation address bits from the incoming load operation 202. For example, the Multiplexer 230 can be a 4:1 multiplexer, which can be configured to select a group of 16 store byte valid bits in the data valid bit vector from an 8-bit boundary specified by the load operation address bits. The Multiplexer 230 can be coupled to a comparison circuit 240, which can be configured to receive the group of 16 store byte valid bits on line 232 and an incoming load operation byte mask on line 235 and generate a "store forward OK" signal if the store instruction data completely covers the WCB entry referenced by the incoming load operation. The heavy lines in the comparison circuit 240 indicate a 16-bit data path. The comparison circuit 240 can include a 16-bit inverter logic 242 which can be coupled to a first 16-bit AND-OR logic 250. The inverter 242 can be configured to receive the group of 16 store byte valid bits selected by the Multiplexer 230 on line 232 and output an inverted version of the group of 16 store byte valid bits onto line 244. The 16-bit AND-OR logic can be implemented with 16 AND gates, which can be configured to receive one bit from either the group of 16 store byte valid bits on line 232 or an inverted bit from the group of 16 store byte valid bits on line 244 and one bit from the incoming load operation byte mask on line 235. The first 16-bit AND-OR logic 250 can be configured to receive the inverted 16 store byte valid bits on line 244 and can be coupled to a NAND gate 270 and the first 16-bit AND-OR logic 250 can be configured to receive the incoming load operation byte mask on line 235. A second AND-OR 16-bit logic 260 also can be coupled to the NAND gate 270 and the second 16-bit AND-OR logic 260 can be configured to receive the group of 16 store byte valid bits selected by the Multiplexer 230 on line 232 and the incoming load operation byte mask on line 235. The NAND gate 270 is configured to receive a signal from each of the first and second 16-bit AND-OR logics 260 and 250 on lines 262 and 252, respectively, and, generate the "store forward OK" signal if the store instruction data completely covers the WCB entry referenced by the incoming load operation.

The present invention satisfies the second requirement by taking advantage of the fact that each WCB is sized to match the system coherence granularity (that is, the cacheline size). All individual store operations that combine into a singular WCB entry become globally observed at the same time. Embodiments of the present invention make use of this fact to enable multiple store buffer forwarding in a system with a restrictive memory model, thus, improving the performance of the system.

Embodiments of the present invention can significantly improve the performance of code that has a high occurrence of instruction sequences in which a load operation is dependent on two or more temporally close store operations. Existing IA-32 processors, as well as other processors with restrictive memory models, traditionally stall the execution of the load operation until the offending store operations leave the store buffer and become globally observed. In an embodiment of the present invention improves on this method by only stalling the load operation until the store operations are accepted into the WCB, which removes the restriction that the store operations must become globally observed (a process that can take many hundreds of cycles) before the load operation can be satisfied.

This is not just a theoretical performance improvement since many compilers produce situations in which the present invention is likely to be beneficial. For example, compilers can usually provide an optimization to remove as many instances of stalling the load operations as possible. Unfortunately, these optimizations usually result in a larger memory footprint for the program, as well as slower execution times, which result in the compiler optimizations not always being used. Therefore, using embodiments of the present invention, can result in faster, more efficient and compact programs.

One apparently common situation in which the compiler cannot optimize the problem away is in multimedia code which regularly generates code sequences having two 32-bit store operations that are immediately followed by one completely overlapping 64-bit load operation. This sequence is used to move data from the integer register file to the MMX (floating point) register file. This invention has the potential to greatly improve the user's "Internet experience" and to enhance other multimedia applications as well.

Figure 3:
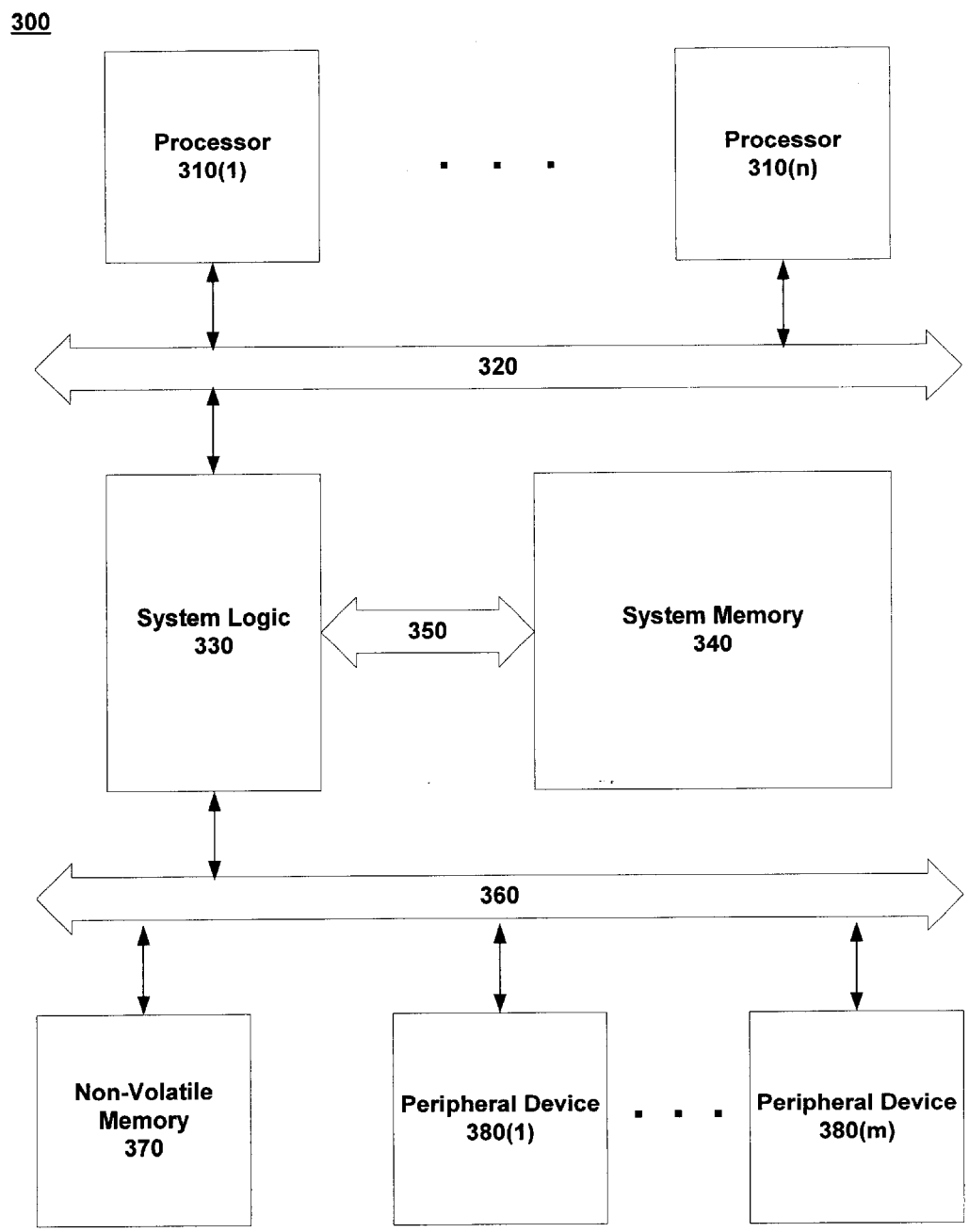
FIG. 3 is a block diagram of a computer system in which multiple store buffer forwarding can be implemented, in accordance with an embodiment of the present invention.

FIG. 3 is a block diagram of a computer system 100 that is suitable for implementing the present invention. In FIG. 3, the computer system 100 includes one or more processors 300(1)–310(n) coupled to a processor bus 320, which can be coupled to a system logic 330. Each of the one or more processors 310(1)–310(n) are N-bit processors and can include one or more N-bit registers (not shown). The system logic 330 can be coupled to a system memory 340 through bus 350 and coupled to a non-volatile memory 370 and one or more peripheral devices 380(1)–380(m) through a peripheral bus 360. The peripheral bus 360 represents, for example, one or more Peripheral Component Interconnect (PCI) buses, PCI Special Interest Group (SIG) PCI Local Bus Specification, Revision 2.2, published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 370 may be a static memory device such as a read only memory (ROM) or a flash memory. Peripheral devices 380(1)–380(m) include, for example, a keyboard; a mouse or other pointing devices; mass storage devices such as hard disk drives, compact disc (CD) drives, optical disks, and digital video disc (DVD) drives; displays and the like.

In accordance with an embodiment the present invention, a method for multiple store buffer forwarding in a system with a restrictive memory model includes executing multiple store instructions, executing a load instruction, determining that a memory region addressed by the load instruction matches a cacheline address in a memory, determining that data stored by the multiple store instructions completely covers the memory region addressed by the load instruction, and transmitting a store forward is OK signal.

In accordance with an embodiment the present invention, a machine-readable medium having stored thereon multiple executable instructions for multiple store buffer forwarding in a system with a restrictive memory model, the multiple instructions include instructions to:

execute multiple store instructions, execute a load instruction, determine that a memory region addressed by the load instruction matches a cacheline address in a memory, determine that data stored by the multiple store instructions completely covers the memory location in the memory specified by the load instruction, and transmit a store forward is OK signal.

In accordance with an embodiment the present invention, a processor system includes a processor, a system memory coupled to the processor, and a non-volatile memory coupled to the processor in which is stored an article of manufacture including instructions adapted to be executed by the processor, the instructions which, when executed, encode instructions in an instruction set to enable multiple store buffer forwarding in a system with a restrictive memory model. The article of manufacture includes instructions to: execute multiple store instructions, execute a load instruction, determine that a memory region addressed by the load instruction matches a cacheline address in a memory, determine that data stored by the multiple store instructions completely covers the memory location in the memory specified by the load instruction, and transmit a store forward is OK signal.

It should, of course, be understood that while the present invention has been described mainly in terms of microprocessor- and multi-processor-based personal computer systems, those skilled in the art will recognize that the principles of the invention may be used advantageously with alternative embodiments involving other integrated processor chips and computer systems. Accordingly, all such implementations which fall within the spirit and scope of the appended claims will be embraced by the principles of the present invention.

What is claimed is:

1. A method for multiple store buffer forwarding, comprising:

executing a plurality of store instructions to store a plurality of data values in a plurality of memory locations in a memory;

executing a load instruction to load the plurality of data values from the plurality of memory locations in the memory, a size of the plurality of memory locations equaling a size of a memory region addressed by the load instruction;

generating a store forward is OK signal;

determining that the memory region addressed by the load instruction matches a memory region corresponding to a cacheline address in the memory;

determining that the plurality of data values stored by the plurality of store instructions completely corresponds to the memory region addressed by the load instruction; and transmitting the store forward is OK signal.

2. The method of claim 1, wherein executing the load instruction comprises:

loading the data from a write combining buffer.

3. The method of claim 1, wherein determining that the memory region addressed by the load instruction matches the memory region corresponding to a cacheline address in a memory comprises:

comparing an address of the memory region addressed by the load instruction and the cacheline address; and determining that the address of the memory region addressed by the load instruction is the same address as the cacheline address.

4. The method of claim 1, wherein determining that the plurality of data values stored by the plurality of store instructions completely corresponds to the memory region addressed by the load instruction comprises:

determining that a size of the plurality of data values stored by the plurality of store instructions equals a size of the memory region addressed by the load instruction.

5. The method of claim 1, further comprising:

terminating the method, if an address of the memory region addressed by the load instruction and the cacheline address in the memory are different.

6. The method of claim 1, further comprising:

re-executing the load instruction, if the memory region addressed by the load instruction incompletely corresponds to the plurality of data values stored by the plurality of store instructions.

7. The method of claim 1, wherein said executing the plurality of store instructions produces a single value that is invisible to other concurrent processes.

8. A machine-readable medium having stored thereon a plurality of executable instructions for multiple store buffer forwarding, the plurality of instructions comprising instructions to:

execute a plurality of store instructions to store a plurality of data values in a plurality of memory locations in a memory;

execute a load instruction to load the plurality of data values from the plurality of memory locations in the memory, a size of the plurality of memory locations equaling a size of a memory region addressed by the load instruction;

generate a store forward is OK signal;

determine that the memory region addressed by the load instruction matches a memory region corresponding to a cacheline address in a memory;

determine that the plurality of data values stored by the plurality of store instructions completely corresponds to the memory region addressed by the load instruction; and transmit the store forward is OK signal.

9. The machine-readable medium of claim 8, wherein the execute the load instruction comprises instructions to:

load the data from a write combining buffer.

10. The machine-readable medium of claim 8, wherein the determine that the memory region addressed by the load instruction matches the memory region corresponding to a cacheline address in a memory comprises instructions to:

compare the address of the memory region addressed by the load instruction and the cacheline address; and determine that the address of the memory region addressed by the load instruction is the same address as the cacheline address.

11. The machine-readable medium of claim 8, wherein the determine that the plurality of data values stored by the plurality of store instructions completely corresponds to the memory region addressed by the load instruction comprises an instruction to:

determine that a size of the plurality of data values stored by the plurality of store instructions equals a size of the memory region addressed by the load instruction.

12. The machine-readable medium of claim 8, further comprising an instruction to:

terminate the plurality of instructions, if an address of the memory region addressed by the load instruction and the cacheline address in the memory are different.

13. The machine-readable medium of claim 8, further comprising an instruction to:

re-execute the load instruction, if the memory region addressed by the load instruction incompletely corresponds to the plurality of data values stored by the plurality of store instructions.

14. The machine-readable medium of claim 8, wherein the execute the plurality of store instructions produces a single value that is invisible to other concurrent processes.

15. A system for multiple store buffer forwarding, comprising:

a processor having a write combining buffer, the write combining buffer including:
  a comparator to receive and compare an incoming load operation target address with all cacheline addresses of existing write combining buffer entries,
  an address and data buffer coupled to the comparator,
  a data valid bits buffer coupled to the address and data buffer,
  a multiplexer coupled to the data valid bits buffer, and
  a comparison circuit coupled to the multiplexer;

a system memory coupled to the processor; and a non-volatile memory coupled to the processor to store instructions to be executed by the processor to:
  execute a plurality of store instructions;
  execute a load instruction;
  determine that a memory region addressed by the load instruction matches a memory region corresponding to a cacheline address in a memory;
  determine that a memory region data stored by the plurality of store instructions completely corresponds to the memory location in the memory specified by the load instruction; and
  transmit a store forward is OK signal.

16. The system of claim 15, the multiplexer to:

receive a byte valid vector from the data valid bits buffer;

receive address bits from the load operation and output valid bits;

select a group of valid bits from the byte valid vector; and output the group of valid bits.

17. The system of claim 15, the comparison circuit to:

receive the group of valid bits;

receive an incoming load operation byte mask;

determine that it is acceptable to forward the data using the group of valid bits and the incoming load operation byte mask; and produce a forward OK signal.

18. The system of claim 15, wherein the execute the plurality of store instructions comprises:

perform a plurality of store operations to store a plurality of data values in a plurality of memory locations in the system memory, a size of the plurality of memory equaling a size of a memory region addressed by the load instruction.

19. The system of claim 18, wherein the execute the load instruction comprises:

load the data from the plurality of memory locations in the system memory; and generate the store forward is OK signal.

20. The system of claim 15, wherein said processor is implemented as a multi-processor having associated with each said multi-processor a separate set of hardware resources.

* * * * *